United States Patent
Arnesson

(10) Patent No.: US 11,242,014 B2
(45) Date of Patent: Feb. 8, 2022

(54) CABLE SPACER ARRANGEMENT

(71) Applicant: VOLVO TRUCK CORPORATION, Gothenburg (SE)

(72) Inventor: Simon Arnesson, Öckerö (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 429 days.

(21) Appl. No.: 16/330,564

(22) PCT Filed: Oct. 4, 2016

(86) PCT No.: PCT/EP2016/073636
§ 371 (c)(1),
(2) Date: Mar. 5, 2019

(87) PCT Pub. No.: WO2018/065033
PCT Pub. Date: Apr. 12, 2018

(65) Prior Publication Data
US 2021/0276498 A1    Sep. 9, 2021

(51) Int. Cl.
*B60R 16/02* (2006.01)
*H02G 3/04* (2006.01)

(52) U.S. Cl.
CPC ....... *B60R 16/0215* (2013.01); *H02G 3/0406* (2013.01)

(58) Field of Classification Search
CPC .............. B60R 16/0215; H02G 3/0406; H02G 3/0616; H02G 3/22; H02G 3/32; H02G 15/013

(Continued)

(56) References Cited

U.S. PATENT DOCUMENTS 3,125,382 A * 3/1964 Herndon et al. ...... E21B 17/105
166/241.7
3,271,506 A * 9/1966 Horst-Edgar ...... H01B 11/1873
174/28

(Continued)

FOREIGN PATENT DOCUMENTS

DE    202006012911 U1    12/2006
EP    2740962 A2    6/2014

(Continued)

OTHER PUBLICATIONS

China Office Action dated Nov. 10, 2020 in corresponding China Patent Application No. 201680089428.5, 14 pages.

(Continued)

*Primary Examiner* — Timothy J Thompson
*Assistant Examiner* — Michael F Mcallister
(74) *Attorney, Agent, or Firm* — Venable LLP; Jeffri A Kaminski

(57) ABSTRACT

The present invention relates to a cable spacer arrangement mountable to a cable of a vehicle; said cable spacer arrangement comprising a cable spacer comprising a circumferentially arranged cable fixing portion having an inner surface arranged to face the cable when mounted thereto, and an outer surface arranged on an opposite side of the cable fixing portion relative to the inner surface; a plurality of circumferentially arranged cable spacing elements, each cable spacing element extending from the cable fixing portion in an at least partially radial direction therefrom, wherein a portion of the cable spacing element is arranged to abut an inner surface of a tube in which the cable is to be positioned, wherein the cable fixing portion further comprises first and second end portions in the circumferential direction such that the cable fixing portion is non-continuous in the circumferential direction thereof.

16 Claims, 7 Drawing Sheets

(58) Field of Classification Search
USPC .................................................. 174/72 A
See application file for complete search history.

(56) References Cited

U.S. PATENT DOCUMENTS

| | | | | | |
|---|---|---|---|---|---|
| 3,433,883 | A | * | 3/1969 | Hahne | H01B 11/186 174/28 |
| 3,789,129 | A | * | 1/1974 | Ditscheid | H01B 11/1856 174/28 |
| 4,100,367 | A | * | 7/1978 | Netzel | H01B 9/0672 138/113 |
| 4,122,298 | A | * | 10/1978 | Brandt | H01B 9/0672 138/112 |
| 4,137,606 | A | | 2/1979 | Wood | |
| 4,219,081 | A | * | 8/1980 | Howe | E21B 17/1028 166/241.7 |
| 4,793,722 | A | * | 12/1988 | Jensen | F01D 25/164 384/99 |
| 5,141,184 | A | * | 8/1992 | Ziu | F16L 39/005 138/113 |
| 5,243,138 | A | * | 9/1993 | Guthke | F16L 3/222 174/138 R |
| 5,785,125 | A | * | 7/1998 | Royer | E21B 17/1021 166/241.1 |
| 6,367,556 | B1 | * | 4/2002 | Moore | E02D 5/805 166/241.1 |
| 6,552,270 | B1 | * | 4/2003 | Heacox | F16L 3/233 174/135 |
| 10,151,113 | B2 | * | 12/2018 | Agee | E04C 5/203 |
| 10,179,556 | B2 | * | 1/2019 | Tamura | H02G 3/0406 |
| 2005/0115029 | A1 | | 6/2005 | Magno et al. | |
| 2007/0120023 | A1 | * | 5/2007 | Martinez | F16L 3/22 248/75 |
| 2009/0272576 | A1 | | 11/2009 | Medina | |

FOREIGN PATENT DOCUMENTS

| | | |
|---|---|---|
| FR | 2929765 A1 | 10/2009 |
| JP | H11109194 A | 4/1999 |
| WO | 2008/102464 A1 | 8/2008 |

OTHER PUBLICATIONS

Extended European Search Report dated Jun. 22, 2020 in corresponding European Application No. 20176391.9, 7 pages.

* cited by examiner

CABLE SPACER ARRANGEMENT

TECHNICAL FIELD

The present invention relates to a cable spacer arrangement. The invention also relates to a cable spacer and a cable arrangement comprising such a cable spacer arrangement. The invention is applicable on vehicles, in particularly vehicles comprising hollow beams or tubes, such as e.g. buses. Although the invention will mainly be described in relation to a buss, other vehicles are also conceivable. Other applications are also conceivable such as e.g. wind turbines, ships, etc.

BACKGROUND

In connection with vehicles, such as e.g. buses, cars or heavy duty vehicles, cables are often routed within different structures of the vehicle. The cables can, for example, be routed within the door frame or under the seats of the vehicle, etc. For some vehicles, cables are often routed within a tube, tube-like frame structure or a pipe. These structures are common in the field of buses where the bus comprises a plurality of tubes or tube-like structures defining the frame structure of the vehicle. It is thus particularly suitable to route cables in these tubes as it provides a relatively protected environment for the cable.

However, the cables may be movable relative to the tube in which they are positioned. This may be caused by the fact that the cable may be connected to e.g. a movable portion of the vehicle and a relative motion between the cable and the tube is thus created. Hereby, there is a risk that the cable is worn out due to chafing of the cable against the inner surface of the tube, etc.

According to the prior art, a solution for the above described problem is to cover the cable in a protective and flexible hose or the like. The flexible hose may be arranged to cover the entire cable or portions of the cable positioned near corners or other positions of the tube at which there is an increased risk of chafing the cable.

However, the prior art presents a solution which is relatively complex and difficult to assemble to the pipe. There is thus a need to provide a protective arrangement for a cable which is less complex and thus easier to connect to the cable.

SUMMARY

It is an object of the present invention to provide a cable spacer arrangement which is easier to assemble to a cable in comparison to the solutions presented by the prior art. The object is at least partly achieved by a cable spacer arrangement according to claim 1.

According to a first aspect of the present invention, there is provided a cable spacer arrangement mountable to a cable of a vehicle; the cable spacer arrangement comprising a cable spacer comprising a circumferentially arranged cable fixing portion having an inner surface arranged to face the cable when mounted thereto, and an outer surface arranged on an opposite side of the cable fixing portion relative to the inner surface; a plurality of circumferentially arranged cable spacing elements, each cable spacing element extending from the cable fixing portion in an at least partially radial direction therefrom, wherein a portion of the cable spacing element is arranged to abut an inner surface of a tube in which the cable is to be positioned, wherein the cable fixing portion further comprises first and second end portions in the circumferential direction such that the cable fixing portion is non-continuous in the circumferential direction thereof.

The wording "first and second end portions in the circumferential direction" should be understood to mean that the cable fixing portion comprises a cut-through portion, or opening, extending substantially in the axial direction thereof between the end portions.

An advantage of the present invention is thus that the cable spacer arrangement can be connected to the cable via the cut-through portion between the first and second end portions in the circumferential direction. Hereby, an improved connection of the cable spacer arrangement is provided, which is particularly beneficial for relatively long cables. A substantial improvement is thus provided in comparison to the prior art which has to assemble the flexible hose to the cable from an end portion of the cable, which is a more time consuming time process.

A further advantage is that the circumferentially arranged cable spacing elements will continuously keep the cable at a certain distance from an inner surface of the pipe, thus reducing the risk of chafing the cable.

According to an example embodiment, the cable fixing portion may comprise a circumferentially arranged protrusion positioned at an opposite axial end portion of the cable fixing portion relative to the plurality cable spacing elements.

The circumferentially arranged protrusion may extend around the entire circumferential surface of the cable fixing portion, or extend at least partially around the circumferential surface of the cable fixing portion. The circumferentially arranged protrusion may also be provided to the axial end portion of the cable fixing portion in a piece wise manner, such that alternatingly ridges and grooves are provided at the axial end portion.

An advantage of the circumferentially arranged protrusion is that a cable spacer fixing device, which will be described further below, is prevented from moving in the axial direction and loose its connection to the cable fixing portion. Thus, it is further secured that the cable spacer fixing device will not fall off from the cable fixing portion.

According to an example embodiment, the cable fixing portion may be provided with a plurality of axially extending indications of fracture, each of the plurality of indications of fracture being arranged between a respective pair of cable spacing elements in the circumferential direction.

The wording "indication of fracture" should be understood as a portion at which it is easier to tear off the cable fixing portion into sub-portions. The indication of fracture may, for example, be arranged as a perforation in the cable fixing portion.

According to an example embodiment, each of the plurality of indications of fracture may extend between axial end portions of the cable fixing portion.

An advantage of the plurality of indications of fracture is that the cable spacer arrangement can be easily provided into different sizes. Hereby, a universal cable spacer arrangement is provided which can be efficiently fitted to cables of various thicknesses. Also, the plurality of indications of fracture can contribute to an improved bending characteristic of the cable spacer arrangement, and in particular the bending characteristics of the cable fixing portion such that it can bend and follow the surface of the cable it is connected to.

According to an example embodiment, the cable spacer arrangement may further comprise a cable spacer fixing device provided in abutment with the outer surface of the cable fixing portion for fixating the cable spacer to the cable.

An advantage of providing an external fixing device is that improved connection to the cable is provided.

The cable spacer fixing device may, for example, be a clamping device or the like providing a circumferential clamping force between the cable and the inner surface of the cable fixing portion.

According to an example embodiment, each of the plurality of cable spacing elements may be arranged in a wave-shaped pattern.

An advantage is that the cable spacer arrangement is better balanced in the pipe. Also, the wave-shaped pattern provides for simplified assembly in the pipe as the cable with the arrangement attached thereto merely needs to be guided into the pipe wherein the wave-shape will form against the inner surface of the pipe.

According to an example embodiment, a radially outer end portion of each of the plurality of cable spacing elements may be provided with a hook-shaped portion, the hook-shaped portion having a ridge portion radially facing away from the cable fixing portion.

An advantage is that the outer end portions are directed away from the pipe, thus reducing the risk of damaging the internal structure of the pipe. Also, as the ridge portion will be arranged in abutment with the inner surface of the pipe, the cable spacing elements may be movable within the pipe in an improved manner. Furthermore, it is also possible to provide the outer end portion with a cover for either increasing or reducing the friction against the inner surface of the pipe. For some applications it may be desirable to increase the friction to keep the cable spacing elements in position, while in other applications it may be desirable to reduce the friction to further simplify the positioning of the cable spacing element into the tube.

According to an example embodiment, the cable fixing portion may be a first cable fixing portion, wherein the cable spacer further comprises a second circumferentially arranged cable fixing portion axially spaced apart from the first cable fixing portion, wherein the plurality of circumferentially arranged cable spacing elements extends between the first and second cable fixing portions.

An advantage is that the cable spacing elements provides for improved stability over time due to the first and second cable fixing portions. Thus, the cable spacing element is less affected by relaxation/creep of the material in the cable spacing elements as they are connected at both axial ends thereof. Furthermore, it is also possible to adjust the axial displacement between the first and second cable fixing portions. Hereby, the clamping force against the inner surface of the pipe can be controlled. Also, adjustment to various pipe dimensions is further increased.

Moreover, using two cable fixing portions reduces the risk of chafing the cable in corners or pipe entrances if positioning the cable spacer arrangement at these positions.

According to an example embodiment, the plurality of circumferentially arranged cable spacing elements may form a first and a second ball shaped portion.

According to a second aspect of the present invention, there is provided a cable spacer for a cable of a vehicle, the cable spacer comprising a flexible cable fixing portion at a first end portion thereof and a plurality of cable spacing elements spaced apart from each other and extending away from the flexible cable fixing portion in a first direction, wherein the cable spacer extends between a first end portion and a second end portion in a second direction, wherein the second direction is substantially perpendicular to the first direction.

Hereby, an improved cable spacer is provided which can be easily provided and connected to a cable.

According to an example embodiment, the flexible cable fixing portion may be bendable around a geometric axis extending in the first direction.

An advantage is that the flexible cable fixing portion can be bendable around a cable and attached thereto.

According to an example embodiment, each of the plurality of cable spacing elements may be bendable around a geometric axis extending in the second direction and located at an interface between the respective cable spacing element and the flexible cable fixing portion.

Hereby, the cable spacing elements are adapted to fit tubes of different size and configuration, thus providing a cable spacer which is suitable for pipes of various size and dimension.

According to an example embodiment, each of the plurality of cable spacing elements may have a stiffness which is greater in a direction perpendicular to the first and second directions compared to a stiffness in the second direction.

An advantage is that a sufficient compression force against the inner surface of the pipe may be achieved.

According to an example embodiment, the cable spacer may be bendable and have a shape such that it is formable into a cone-shaped form when being wind up around a geometric axis parallel to the first direction.

An advantage of a cone-shaped form is that the cable can be arranged in a center thereof and thus at all positions provided at a distance from the pipe.

According to an example embodiment, the cable fixing portion may comprise a plurality of indications of fracture extending in the first direction, wherein each of the plurality of indications of fracture is arranged between a respective pair of cable spacing elements as seen in the second direction.

An advantage is that the cable spacer easily can be provided in different sizes to fit cables of substantially any diameter thickness. Hence, the cable spacer can be cut into different sizes for substantially all different cables in a vehicle.

According to an example embodiment, each of the plurality of cable spacing elements may extend in the first direction in a wave-shaped pattern.

Further effects and features of the second aspect are largely analogous to those described above in relation to the first aspect of the present invention.

According to a third aspect of the present invention, there is provided a cable arrangement comprising a cable configured to be mounted within a tube of a vehicle, and a cable spacer arrangement according to any of the embodiments described above in relation to the first aspect of the present invention, wherein the cable spacer arrangement circumferentially enclosing a portion of the cable.

Effects and features of the third aspect are largely analogous to those described above in relation to the first and second aspects of the present invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

Figure 1:
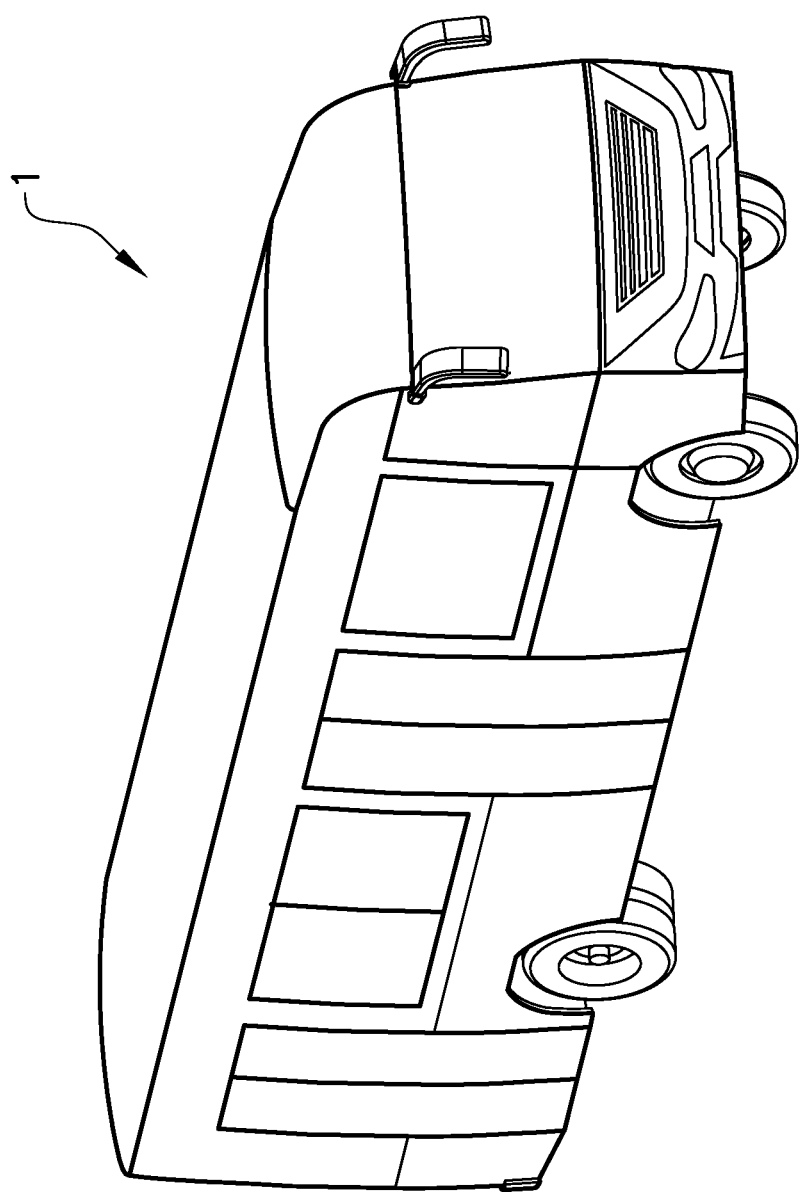
FIG. 1 is a perspective view of a vehicle, in the form of a bus, which can preferably use a cable spacer arrangement according to an example embodiment of the present invention.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 1 having a structure which suitably makes use of a cable spacer arrangement 100 (see FIGS. 2-5d) according to example embodiments of the present invention. The vehicle 1 depicted in FIG. 1 is a bus, which generally comprises a beam frame structure for which the inventive cable spacer arrangement 100, which will be further described below, is particularly suitable for.

Figure 2:
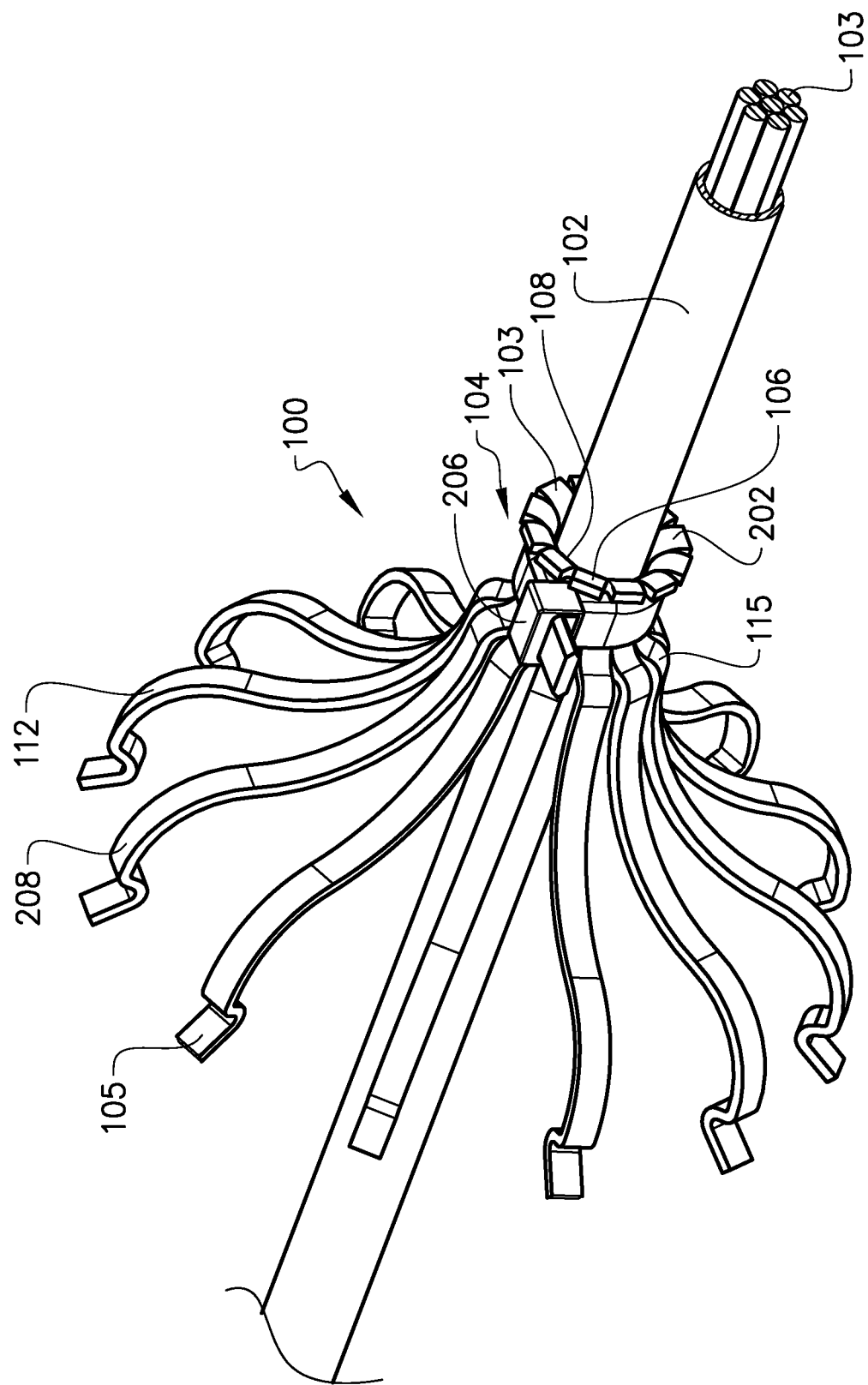
FIG. 2 is a perspective view of a cable spacer arrangement according to an example embodiment of the present invention.

Turning now to FIG. 2, which is a perspective view of a cable spacer arrangement 100 according to an example embodiment of the present invention. The cable spacer arrangement 100 is connected to a cable 102. In the example embodiment, the cable 102 comprises a plurality of electrical wires 103. The cable spacer arrangement 100 may also be connected to a hose or tube, etc. Hence, the cable spacer arrangement 100 should not be construed as limited to only being able to connect to a cable 102. Furthermore, the cable spacer arrangement 100 comprises cable spacer 104 which is arranged to position the cable 102 at a distance from an inner surface of a tube (see FIG. 4) in which the cable 102 is positioned. The cable spacer 104 comprises a cable fixing portion 106 which is arranged to connect to the cable 102. More specifically, the cable fixing portion 106 comprises an inner surface 108 facing the cable 102, i.e. the inner surface 108 is arranged in abutment with the cable 102. The cable fixing portion 106 further comprises an outer surface 110 (see FIG. 3b) on a radially opposite side thereof. The outer surface 110 faces away from the cable 102. Moreover, the cable spacer arrangement 100 comprises a cable spacer fixing device 206. The cable spacer fixing device 206 is arranged to tightly attach the cable spacer arrangement 100 to the cable 102. The cable spacer fixing device 206 may, for example, be a strap or belt, etc.

Moreover, the cable spacer arrangement 100 further comprises a plurality of circumferentially arranged cable spacing elements 112. Hence, the cable spacing elements 112 are arranged in the circumferential direction of the cable spacer arrangement 100, wherein each of the cable spacing elements 112 extends at least partially in the radial direction of the cable spacer arrangement 100. According to the embodiment depicted in FIG. 2, each of the cable spacing elements 112 also extends in the axial direction of the cable spacer arrangement 100 in a direction away from the cable fixing portion 106. The purpose of the cable spacing elements 112 is to be arranged in abutment with the inner surface of the tube. In detail, a radially outer end portion 208 of the cable spacing element 112 is arranged in abutment with the inner surface of the tube when the cable spacer arrangement is positioned therein.

Still further, the cable fixing portion 106 comprises a circumferentially arranged protrusion 202. The circumferentially arranged protrusion 202 is positioned at an opposite axial end portion 103 of the cable fixing portion 106 relative to the plurality of cable spacing elements 112. Accordingly, the circumferentially arranged protrusion 202 and the plurality of cable spacing elements 112 are arranged on a respective side of the cable spacer fixing device 206 as seen in the axial direction thereof. The circumferentially arranged protrusion 202 protrudes in the radial direction and thereby contributes to prevent the cable spacer fixing device 206 from being accidentally disconnected from the cable fixing portion 106. As also depicted in FIG. 2, the plurality of cable spacing elements 112 forms a radial protruding portion 115 preventing axial movement of the cable spacer fixing device 206 towards the plurality of cable spacing elements 112.

Moreover, the cable spacing elements 112 comprises a hook-shaped outer end portion 105. The hook-shaped outer end portion 105 extends in an at least partially radial direction away from the cable 102.

Figure 3A:
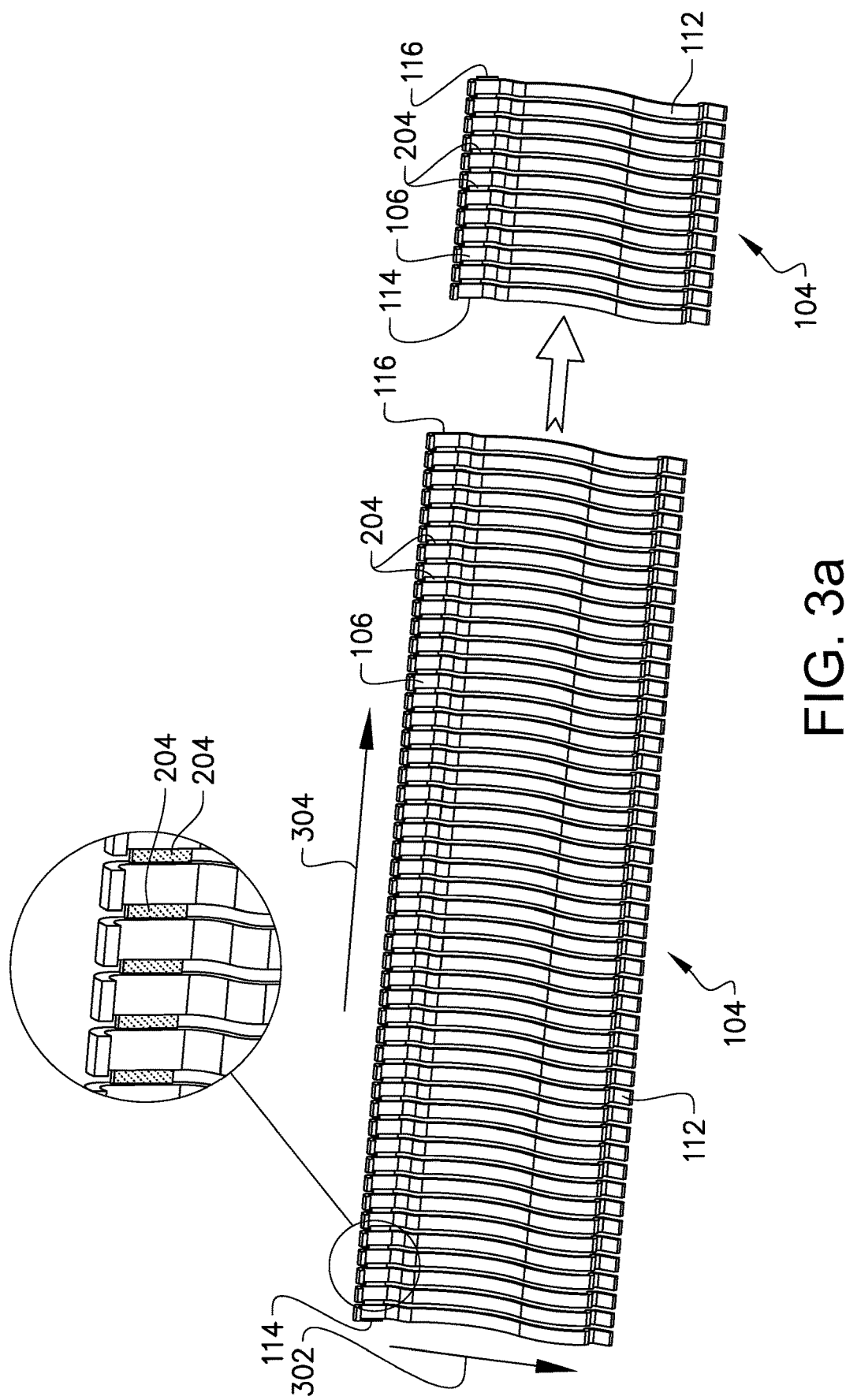
FIG. 3a shows an example embodiment of a cable spacer material before being cut into desired pieces that forms part of the cable spacer arrangement in FIG. 2.

Turning now to FIG. 3a which shows an example embodiment of the cable spacer material before being cut into desired pieces to form part of the cable spacer arrangement 100 described above in relation to the description of FIG. 2.

As depicted in FIG. 3a, the cable spacer 104 is provided from a large piece of material, which is the cable spacer 104 shown to the left in FIG. 3a. The large piece of material is cut into a desired size of the cable spacer 104, which desired size is shown to the right in FIG. 3a and comprises, in the non-limiting depicted example, twelve cable spacing elements 112.

The cable spacer 104 comprises, as described above, a plurality of cable spacing elements 112. The plurality of cable spacing elements 112 extends away from the cable fixing portion 106 in a first direction, indicated by arrow 302. Moreover, the cable spacer 104 also extends in a second direction, indicated by arrow 304, between a first end portion 114 and a second end portion 116. In the assembled configuration depicted in FIG. 3b, the first 114 and second 116 end portions are end portions as seen in the circumferential direction of the cable spacer arrangement 100.

As further depicted in FIG. 3a, the cable spacer 104 comprises a plurality of indications of fracture 204. The indications of fracture 204 are arranged in the cable fixing portion 106 and extend in the first direction 302 of the cable spacer 104. The indications of fracture 204 hence extend in the axial direction of the cable spacer arrangement 100 in the assembled configuration as depicted in e.g. FIG. 2. In further detail, each indication of fracture 204 is arranged in the cable fixing portion 106 at positions between a respective pair of cable spacing elements 112 as seen in the second direction thereof. The indications of fracture 204 may, for example be a perforation of the cable fixing portion 106. Other examples are of course also conceivable, such as a reduction in material thickness, or a combination of perforations and reduction in material thickness, etc.

Figure 3C:
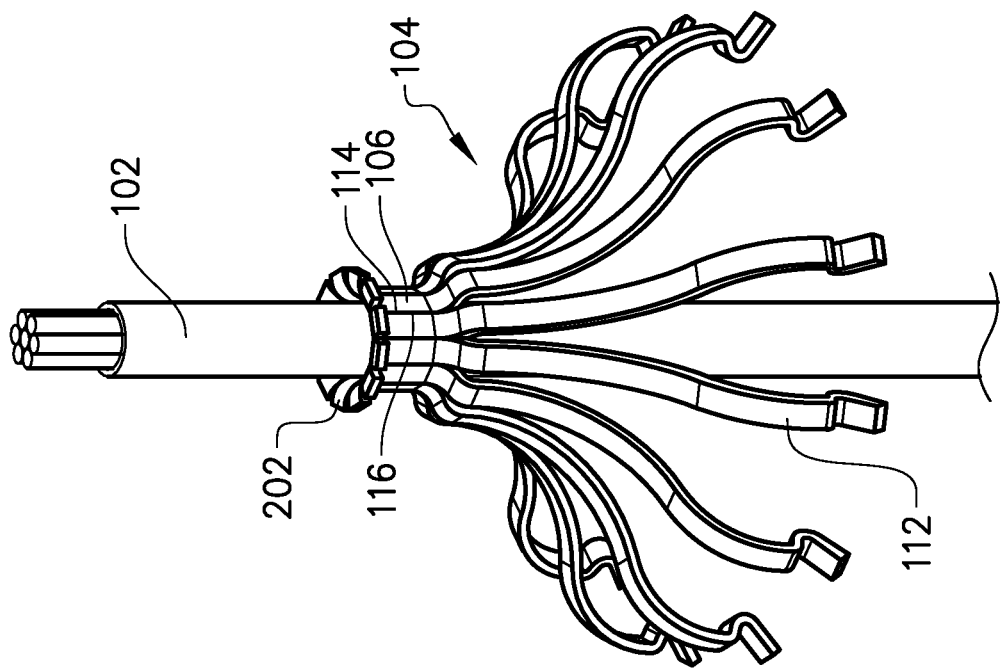
FIGS. 3b-3c illustrate the cable spacer material in FIG. 3a wound around a cable.
Figure 3B:
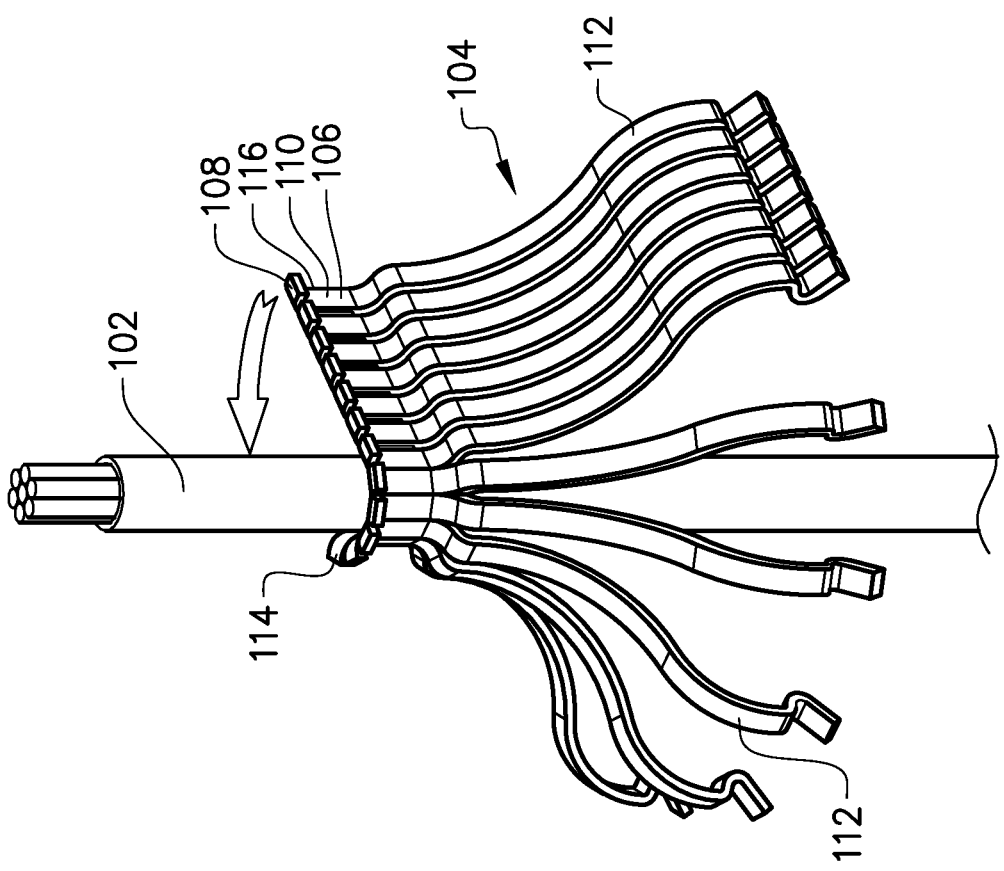

By means of the indications of fracture 204, it is relatively easy to cut/tear the material of the cable spacer 104 into a desired size. FIGS. 3b-3c, as will be described below, depict the cable spacer 104 connected to a cable 102 having a specific dimension. It is thus, with the indications of fracture 204, possible to provide a cable spacer 104 for substantially any dimension, i.e. diameter, of the cable 102.

Reference is now made to FIGS. 3b-3c which illustrate how the cable spacer 104 is wound around a cable 102. Although FIGS. 3b-3c depict the cable spacer 104 being wound around a single cable, it should be readily understood that a bundle of cables, i.e. a plurality of cables, may be held together by the cable spacer 104 as well.

The cable spacer 104 is provided from the material depicted in FIG. 3a, i.e. cut into a size suitable for the specific cable 102 depicted in FIGS. 3b-3c. The cable spacer 104 is thereafter wound/rolled around the cable 102 such that the first 114 and second 116 end portions eventually, as depicted in FIG. 3c, faces each other. The cable spacer elements 112 are also evenly distributed when the cable spacer 104 is finally attached to the cable 102. Furthermore, the cable fixing portion 106 is relatively flexible to further improve the connection to the cable 102.

In FIG. 3c, the circumferentially arranged protrusion 202 is more clearly depicted as the cable spacer fixing device (206 in FIG. 2) is not yet connected to the cable spacer 104. Further, FIG. 3b more clearly depicts the above described inner 108 and outer surfaces 110 of the cable spacer 104.

Figure 4:
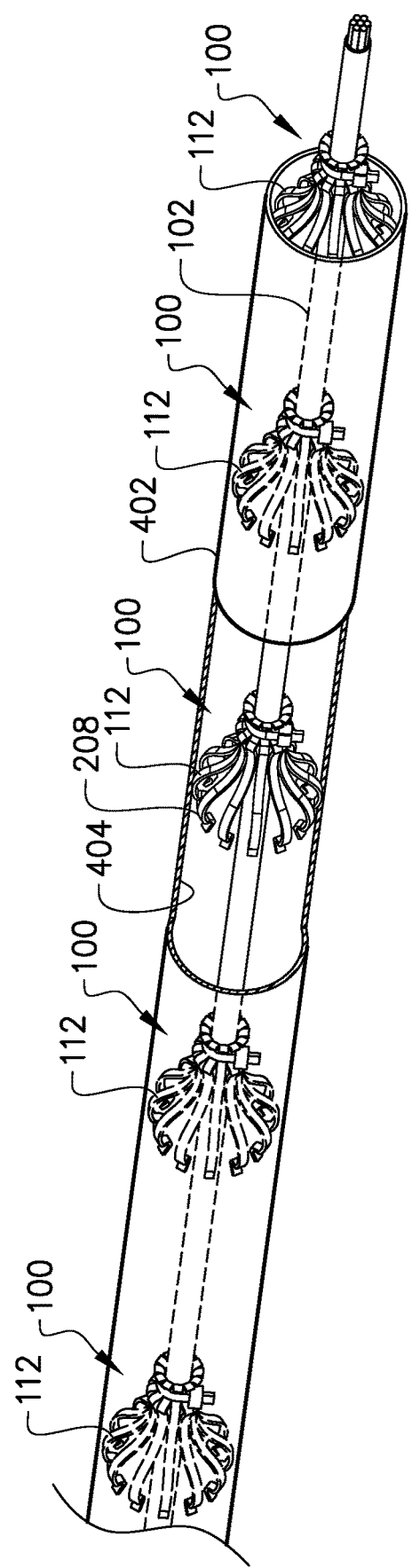
FIG. 4 schematically illustrates the cable spacer arrangement of FIG. 2 mounted to a cable positioned in a tube.

Turning to FIG. 4 which schematically illustrates the cable spacer arrangement 100 of FIG. 2 mounted to a cable 102 positioned in a tube 402. More specifically, the cable 102 is provided with a plurality of cable spacer arrangements 100 inside the tube 102. As can be seen in FIG. 4, the radially outer end portions 208 of the cable spacing elements 112 are arranged in abutment with the inner surface 404 of the tube 402. The cable spacing elements 112 are hence compressed in the radial direction when positioned in the tube 402. Hereby, the radially outer end portions 208 of the cable spacing elements 112 exerts a radial compression force against the inner surface 404 of the tube 402. This force will keep the cable spacer arrangement 100 in position within the tube 402 and thus keep the cable 102 at a sufficient distance from the inner surface 404. The cable spacing elements 112 preferably need to be flexible in the radial direction, as a radial distance from the cable 102 to the radially outer end portion 208 is smaller when the cable spacer arrangement 100 is connected within the pipe 402 compared to when not being connected within the pipe 402.

The cable spacer 104 may be provided from any suitable material. However, and as a non-limiting example, the material may be a polyamide material such as e.g. PA66. Other alternatives are of course conceivable, such as flexible metals, plastics, rubber, etc. Also, the material may be a metallic material covered by a plastic material. In such arrangement, both the metallic characteristics as well as the plastic characteristics are provided to the cable spacer 104.

The cable spacer 104 depicted in FIGS. 2-4 can be provided and designed in a number of various ways. Reference is therefore made to FIGS. 5a-5d which illustrates various, alternative example embodiments of the cable spacer.

Figure 5B:
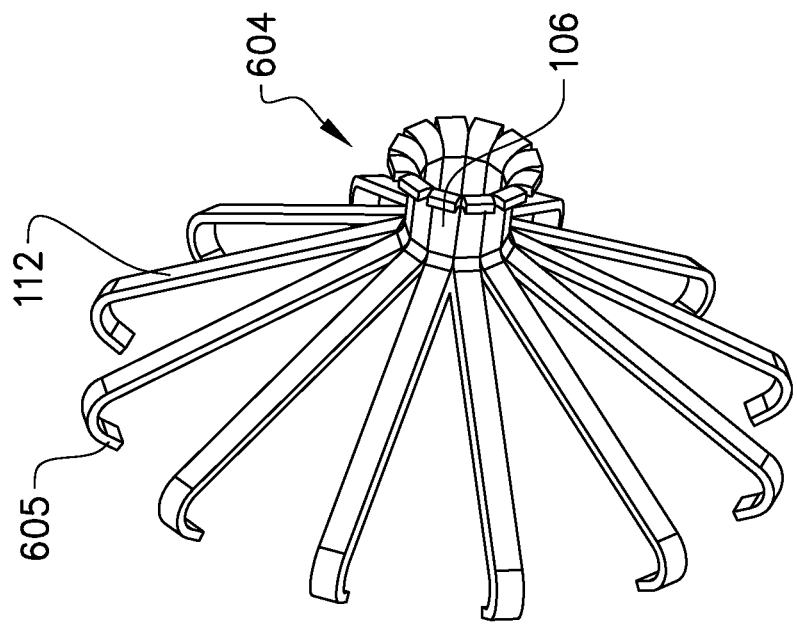
FIGS. 5a-5d illustrate alternative example embodiments of the cable spacer of the present invention.
Figure 5A:
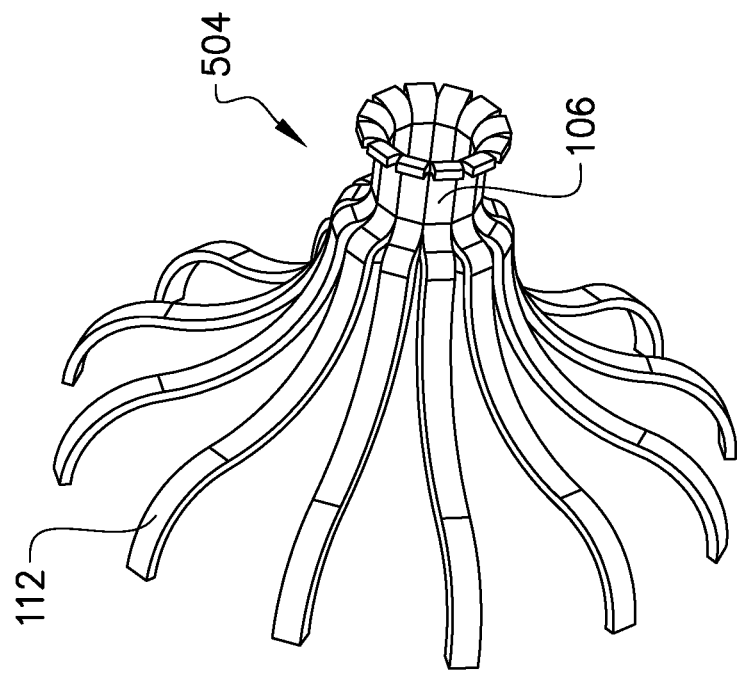

Firstly, and with reference to FIG. 5a, the cable spacer 504 depicted is relatively similar to the cable spacer 104 in the previous figures. The difference in comparison to the cable spacer 104 in FIGS. 2-4 lies in the shape of the cable spacing elements 112. As can be seen in FIG. 5a, the cable spacing elements 112 does not comprise the above described hook-shaped outer end portion 105.

The cable spacer 604 depicted in FIG. 5b on the other hand comprises hook-shaped outer end portions 605. However, the hook-shaped outer end portions 605 depicted in FIG. 5b extend in an at least partially radial direction towards the cable 102. An advantage is that the risk of tearing the cable by the outer end portions 605 of the cable spacing elements 112 is reduced.

Figure 5D:
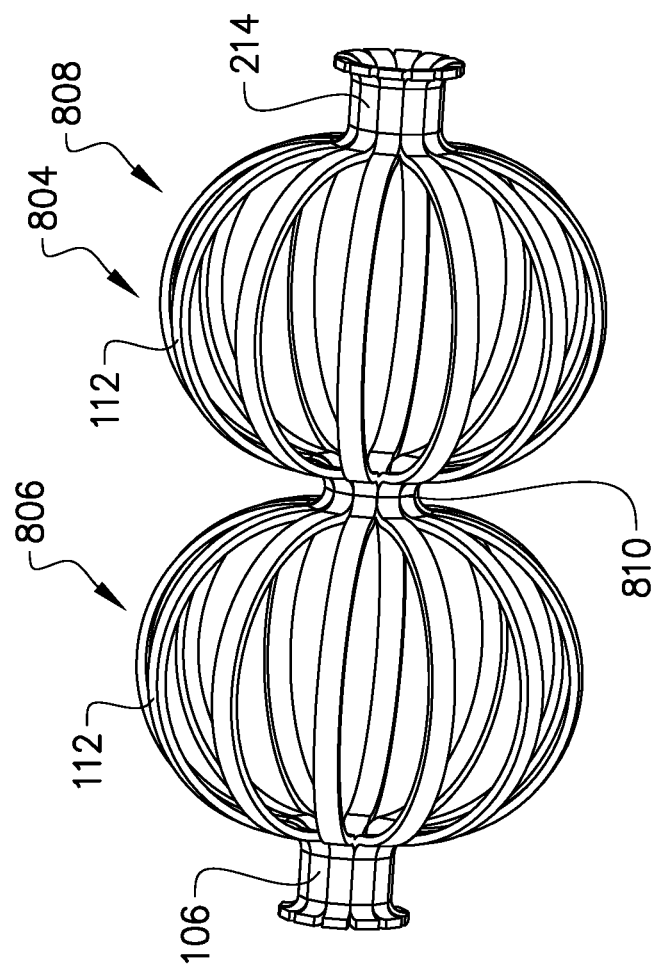
Figure 5C:
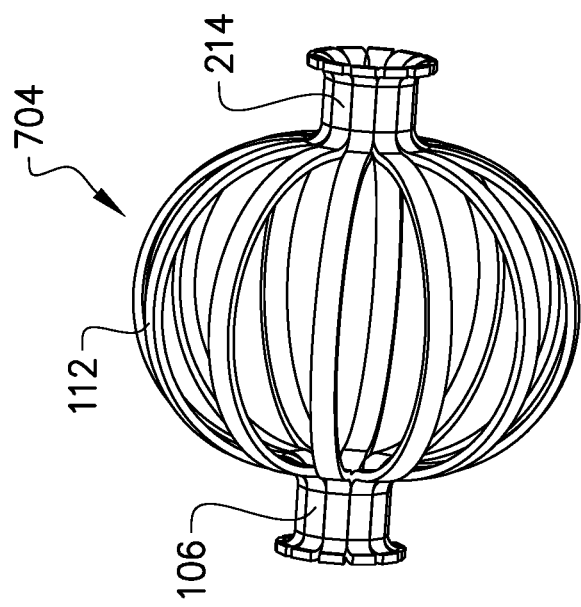

Further to the embodiment depicted in FIG. 5c. In comparison to the above described example embodiments of the cable spacers, the cable spacer 704 in FIG. 5c comprises a second cable fixing portion 214. Hereby, the cable 102 is connected to the cable spacer arrangement 100 at two axially separated positions. The cable spacer elements 112 extend between the first 106 and second 214 cable fixing portions and form a ball shaped portion. As can be seen in FIG. 5c, the ball shaped portion is provided with openings between respective pairs of cable spacing elements 112. An advantage of the embodiment depicted in FIG. 5c is that the cable 102 is connected at two positions, thus providing a better connection between the cable spacer arrangement 100 and the cable 102.

Finally, reference is made to FIG. 5d. The embodiment depicted herein also comprises first 106 and second 214 cable fixing portions, which portions are axially separated from each other. However, the cable spacing elements 112, which extend between the first 106 and second 214 cable fixing portions, are formed into first 806 and second 808 ball shaped portions, which are axially separated from each other. The embodiment in FIG. 5d is thus preferably of larger size in comparison to the other previously described embodiments. Moreover, the cable spacer 804 in FIG. 5d may alternatively also comprise a third cable fixing portion 810 which is positioned between the first 106 and second 214 cable fixing portions as seen in the axial direction of the cable spacer arrangement 100. It is also conceivable to use more than two ball shaped portions, such as a further plurality of ball shaped portions. This may be applicable for larger pipe applications etc. The entire cable may also be covered by ball shaped portions.

It is to be understood that the present invention is not limited to the embodiments described above and illustrated in the drawings; rather, the skilled person will recognize that many changes and modifications may be made within the scope of the appended claims. For example, although the present invention has mainly been described in relation to a bus, the invention should be understood to be equally applicable for any type of vehicle or other applications.

The invention claimed is:

1. A cable spacer arrangement mountable to a cable of a vehicle; the cable spacer arrangement comprising a cable spacer comprising a circumferentially arranged cable fixing portion having an inner surface arranged to face the cable when mounted thereto, and an outer surface arranged on an opposite side of the cable fixing portion relative to the inner surface; a plurality of circumferentially arranged cable spacing elements, each cable spacing element extending from the cable fixing portion in an at least partially radial direction therefrom, wherein a portion of the cable spacing element is arranged to abut an inner surface of a tube in which the cable is to be positioned, wherein the cable fixing portion further comprises first and second end portions in the circumferential direction such that the cable fixing portion is non-continuous in the circumferential direction thereof, wherein the cable fixing portion comprises a circumferentially arranged protrusion positioned at an opposite axial end portion of the cable fixing portion relative to the plurality cable spacing elements.

2. The cable spacer arrangement according to claim 1, wherein the cable fixing portion is provided with a plurality of axially extending indications of fracture, each of said plurality of indications of fracture being arranged between a respective pair of cable spacing elements in the circumferential direction.

3. The cable spacer arrangement according to claim 2, wherein each of said plurality of indications of fracture extends between axial end portions of the cable fixing portion.

4. The cable spacer arrangement according to claim 1, wherein the cable spacer arrangement further comprises a cable spacer fixing device provided in abutment with the outer surface of the cable fixing portion for fixating the cable spacer to the cable.

5. The cable spacer arrangement according to claim 1, wherein each of the plurality of cable spacing elements is arranged in a wave-shaped pattern.

6. The cable spacer arrangement according to claim 1, wherein a radially outer end portion of each of the plurality of cable spacing elements is provided with a hook-shaped portion, said hook-shaped portion having a ridge portion radially facing away from the cable fixing portion.

7. The cable spacer arrangement according to claim 1, wherein the cable fixing portion is a first cable fixing portion, wherein the cable spacer further comprises a second circumferentially arranged cable fixing portion axially spaced apart from the first cable fixing portion, wherein the plurality of circumferentially arranged cable spacing elements extends between the first and second cable fixing portions.

8. The cable spacer arrangement according to claim 7, wherein the plurality of circumferentially arranged cable spacing elements forms a first and a second ball shaped portion.

9. A cable spacer for a cable of a vehicle, said cable spacer comprising a flexible cable fixing portion at a first end portion thereof and a plurality of cable spacing elements spaced apart from each other and extending away from the flexible cable fixing portion in a first direction, wherein the cable spacer extends between a first end portion and a second end portion in a second direction, wherein said second direction is substantially perpendicular to the first direction.

10. The cable spacer according to claim 9, wherein the flexible cable fixing portion is bendable around a geometric axis extending in the first direction.

11. The cable spacer according to claim 9, wherein each of the plurality of cable spacing elements is bendable around a geometric axis extending in the second direction and located at an interface between the respective cable spacing element and the flexible cable fixing portion.

12. The cable spacer according to claim 9, wherein each of the plurality of cable spacing elements has a stiffness which is greater in a direction perpendicular to the first and second directions compared to a stiffness in the second direction.

13. The cable spacer according to claim 9, said cable spacer being bendable and having a shape such that it is formable into a cone-shaped form when being wind up around a geometric axis parallel to the first direction.

14. The cable spacer according to claim 9, wherein the cable fixing portion comprises a plurality of indications of fracture extending in the first direction, wherein each of the plurality of indications of fracture is arranged between a respective pair of cable spacing elements as seen in the second direction.

15. The cable spacer according to claim 9, wherein each of the plurality of cable spacing elements extends in the first direction in a wave-shaped pattern.

16. A cable arrangement comprising a cable configured to be mounted within a tube of a vehicle, and a cable spacer arrangement according to claim 1, wherein the cable spacer arrangement circumferentially enclosing a portion of the cable.

* * * * *